United States Patent
Birtles et al.

(10) Patent No.: US 6,456,196 B1
(45) Date of Patent: Sep. 24, 2002

(54) SIGNALLING MEANS FOR A VEHICLE

(75) Inventors: John Fiddian Birtles, Stable Cottage, Williamstrip Park, Coln St. Aldwyns, Gloucestershire (GB), GL7 5AS; Anthony Thomas Lambert, Swindon (GB); John Pelham Wren, Swindon (GB)

(73) Assignees: John Fiddian Birtles, Gloucestershire (GB); Liberty Gardens Limited, Gloucestershire (GB)

( * ) Notice: Subject to any disclaimer, the term of this patent is extended or adjusted under 35 U.S.C. 154(b) by 0 days.

(21) Appl. No.: 09/230,616
(22) PCT Filed: Jul. 3, 1997
(86) PCT No.: PCT/GB97/01781
  § 371 (c)(1),
  (2), (4) Date: May 17, 1999
(87) PCT Pub. No.: WO98/04435
  PCT Pub. Date: Feb. 5, 1998

(30) Foreign Application Priority Data

| Jul. 29, 1996 | (GB) | 9615901 |
| Sep. 30, 1996 | (GB) | 9620340 |
| Feb. 15, 1997 | (GB) | 9703186 |

(51) Int. Cl.[7] .............................................. B60Q 1/44
(52) U.S. Cl. ..................................................... 340/479

(56) References Cited

U.S. PATENT DOCUMENTS

| 3,427,583 A |   | 2/1969 | Zackey ......................... 340/66 |
| 3,813,542 A | * | 5/1974 | Spadafora .................... 250/221 |
| 5,084,599 A |   | 1/1992 | Libit ......................... 200/61.89 |

FOREIGN PATENT DOCUMENTS

| DE | 2598008  | 10/1987 |
| DE | 4422664  | 3/1995  |
| JP | 60255538 | 12/1985 |

\* cited by examiner

*Primary Examiner*—Daryl Pope
(74) *Attorney, Agent, or Firm*—MacMillan, Sobanski & Todd, LLC

(57) ABSTRACT

Signaling means adapted for use on a vehicle, the signaling means being activated in response to a signal from a sensing means, the sensing means being adapted to sense movement of the brake operating part of the driver in a direction likely to result in the brakes associated with that vehicle being applied, such as, for example, movement of the driver's foot from the accelerator pedal towards the brake pedal. The signaling means may comprise a high mounted stop lamp or other light emitting source visible to drivers of following vehicles. The invention enables drivers of such following vehicles to obtain advance warning of potential hazardous situations arising through imminent deceleration of the vehicle in front.

17 Claims, 3 Drawing Sheets

SIGNALLING MEANS FOR A VEHICLE

DESCRIPTION OF INVENTION

The present invention relates to signalling means for a vehicle of a kind related to the type of signalling means indicating that a vehicle is braking.

Brake lights on a vehicle are illuminated when the brakes of the vehicle are applied, the purpose being to indicate to vehicles following that vehicle that it is slowing down or stopping.

A significant number of accidents are caused when one vehicle runs into the back of another vehicle, and whereas brake lights present on existing vehicles give an indication to a person following that the vehicle in front is braking, it would be advantageous if some earlier warning of slowing down or braking of the vehicle could be provided.

It has been proposed to provide signalling means that will operate on de-acceleration of the vehicle. However, even though many proposals have been made for such devices, they have not been found to he practical, primarily because vehicles in their normal running are continually accelerating and de-accelerating, thus de-acceleration activated signalling means will excessively be operated causing distraction to drivers behind and, because they will often be activated, irrespective of the fact that a "no hazard" situation has arisen, they will tend to be ignored by following drivers, thus causing more confusion than benefit.

It is an object of the present invention to provide new or improved signalling means suitable for use on a motor vehicle.

According to one aspect of the present invention I provide signalling means adapted for use on a vehicle, said signalling means being activated in response to a signal from a sensing means, said sensing means being adapted to sense the movement of the brake operating part of the driver in a direction likely to result in the brakes associated with that vehicle being applied.

Such movement may comprise movement of the foot of the person driving the vehicle from the accelerator and/or may comprise movement of the foot of the driver of the vehicle in a direction from the accelerator towards the brake pedal.

In one form said sensing means may comprise a switch on or near the accelerator that will change condition when the driver's foot is partially or totally removed from the accelerator.

The switch may be pressure sensitive, a contact switch or a proximity switch.

The sensing means may be adapted to sense movement of the driver's foot to a position at which the foot is partly over the brake pedal.

Preferably the sensing means comprise detectors that are capable of sensing movement of the driver's foot, and conveniently may comprise a radiation emission and receiving device, the arrangement being such that the emission device emits radiation which is reflected by the foot of the driver of the vehicle and received by the receiving device. With such an arrangement it may be possible to detect not only movement of the foot but the position of the foot relative to the accelerator pedal of the vehicle and/or the brake pedal, and/or indeed the speed of movement of the foot.

The foot sensing means may be connected to a control circuit which receives input signals from other sensing means associated with the vehicle. Such input signals may comprise a signal indicating the speed of the vehicle, whether or not the vehicle is stationary, and may include further sensing means such as following vehicle detecting means.

Vehicle detecting means may cause the signalling means to operate should a following vehicle come within a specific distance. The specific distance may depend on the speed at which the vehicle is travelling.

It is further envisaged that time delays may be built into the control circuit so that when the device is operated it will not be de-activated until a certain time has elapsed and/or vehicle monitoring means are indicative that the signalling means may be de-activated. Such a provision will prevent constant activation and de-activation of the signalling means, such as in a congested or slow moving traffic situation.

Preferably the sensing means comprise ultrasonic detectors which are capable of detecting not only the position of the foot of the driver but also the rate of movement of the foot.

Thus, the signalling means may only be activated if the rate of movement exceeds a certain threshold.

The sensed movement may comprise a single foot movement or a sequence of movements including movement of the foot of the driver of the vehicle in a direction from the accelerator pedal towards the brake pedal to provide discrimination against other foot movements which may not be in response to a perceived need to apply brakes and which could give rise to false signals.

Preferably a sequence of foot movements is sensed which can be associated with a high probability of application of the brakes.

The signalling means may be activated when the sequence has been completed and may be activated only when the vehicle ignition switch is on and a predetermined sequence of foot movements has been completed. The signalling device may remain activated until the foot of the driver is again returned to the accelerator pedal or the engine is switched off. Such a sequence will minimise the possibility of false alarms which is one of the primary aims of the system and provides a significant advantage over previous proposals.

In a further implementation the velocity of movement of the foot of the driver during its removal from the accelerator pedal and/or movement towards the brake pedal at more than a predetermined rate may signal to drivers of following vehicles that a hazardous situation has been recognised by the driver. In such a situation the signalling means could be the existing hazard warning lamps.

It is further envisaged that the control circuit may also receive input signals from other sensing means associated with the vehicle.

Preferably the signalling means comprises a light-emitting source on the rear of the vehicle and, conveniently, may comprise a high mounted stop lamp of the kind which is now fitted at the rear of most new vehicles.

Alternatively, an additional light source or sources may be provided or another indicating means may be provided which may be illuminated so as to be clearly visible by the driver of a following vehicle, but without itself providing an active light source.

According to a further aspect of the present invention I provide a method of indicating the likelihood of imminent de-acceleration of a vehicle comprising the step of sensing movement of that part of the driver that operates the brakes associated with the vehicle in a direction towards a braking movement.

Preferably the control circuit associated with the signalling means is such that the movement of the part of the driver operative to operate the brakes may be sensed for a period of time so that the travel path of said part of the driver and the speed of said part that is likely to lead to the brakes being applied to the vehicle, can be detected and analysed and the control circuit supplied with such information so that the signalling means operates only when an imminent braking situation is detected to avoid spurious signals being emitted.

The device and method of the present invention provide significant advances over previous devices and recognise that it is the driver of the vehicle who is controlling operation of the vehicle so that analysing movement of the relevant parts of the driver of the vehicle, is more likely to give a clear indication of imminent braking than any measurement associated with the vehicle itself. It is necessary for the driver to react first before the vehicle can respond.

Furthermore, by sensing movement of the relevant parts of the driver of the vehicle and causing activation of the signalling means only when imminent braking of the vehicle is likely, misleading signals are prevented or at least reduced. By the possible incorporation of time delays and inputs from other vehicle sensing means such as the speed of the vehicle, a reliable indication may be given to following drivers of imminent braking of a vehicle in front which may enable the driver of a following vehicle to receive a valuable advance warning of a hazardous situation.

The present invention will now be described in more detail by way of example only with reference to the accompanying drawings.

Figure 1:
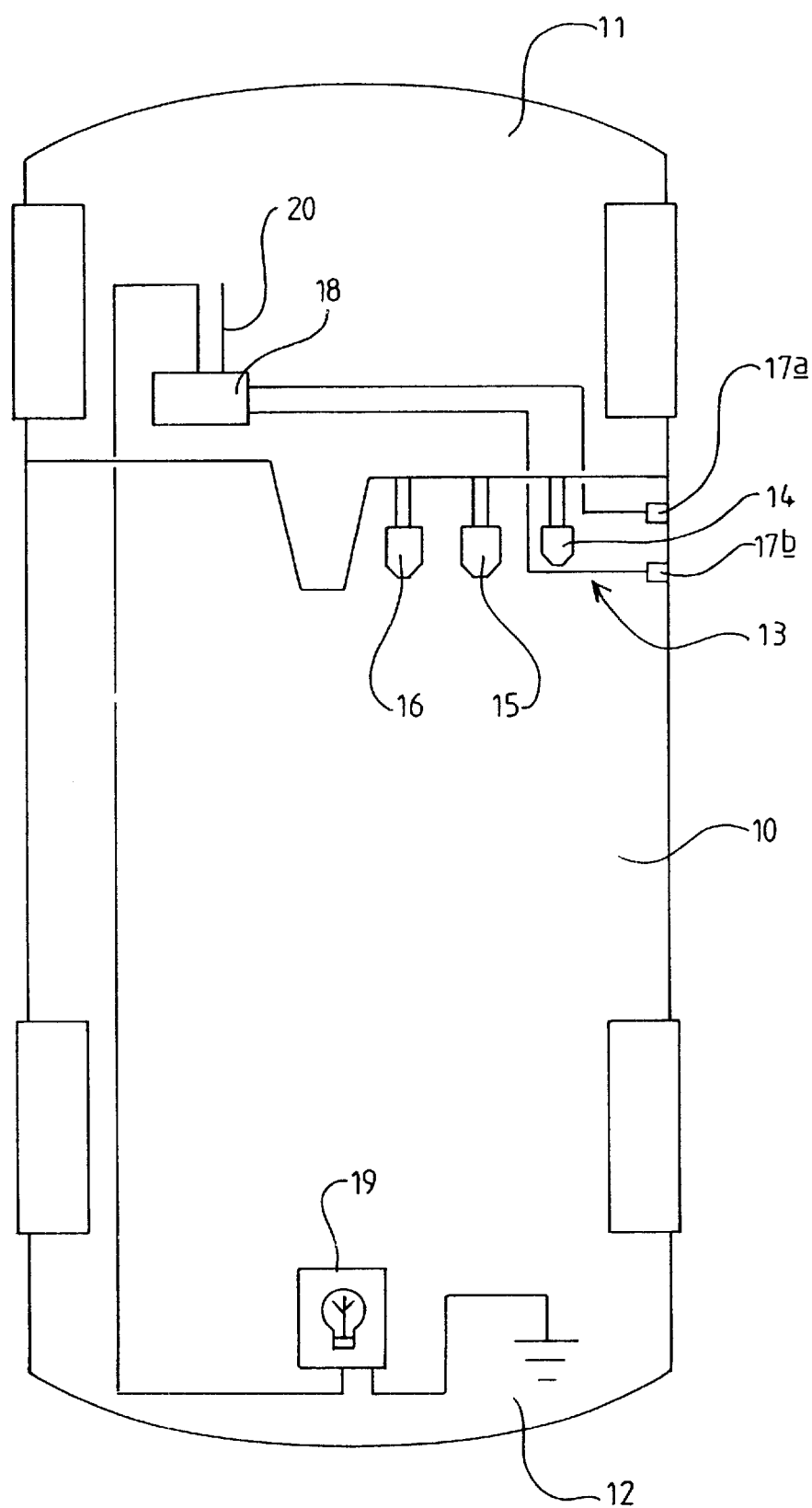
FIG. 1 is a schematic illustration of one embodiment of the invention.

Referring first to FIG. 1 there is shown a schematic illustration of a vehicle 10 having a front 11 and rear 12, the driver's footwell being indicated by an arrow 13.

Positioned near to the accelerator pedal 14 and to one side thereof are a radiation transmission device 17a and a radiation receiving device 17b which may, for example, comprise an ultrasonic transmitter and detector. MURATA MA40 series ultrasonic detectors have been found to be suitable.

The transmitter 17a transmits an ultrasonic signal which is reflected off the foot of the driver and received by the receiver 17b.

Figure 2:
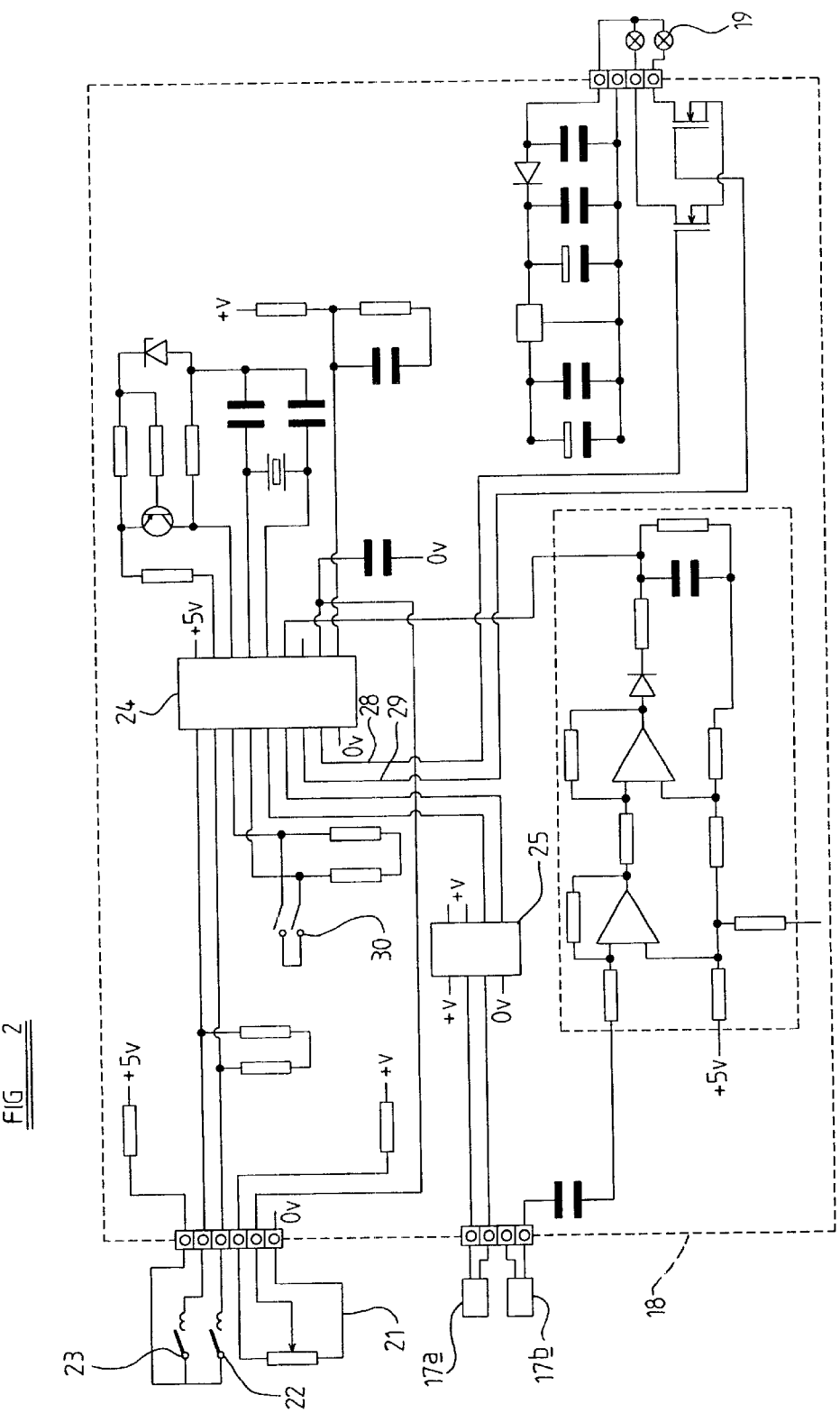
FIG. 2 is a circuit diagram of a control circuit that may be used in the embodiment shown in FIG. 1.

The received signal can be used to indicate either the position of the foot, the speed of movement of the foot or both, the received signal being sent to a control circuit 18 shown in greater detail in FIG. 2.

When movement of the driver's foot is detected in a direction away from the accelerator 14 towards the brake pedal 15, then the signal received by the control circuit 18 is used to be indicative of the likelihood of braking to take place and to illuminate a signalling means in the form of a lamp 19. The signalling means 19 may comprise a high mounted stop lamp commonly provided on modern vehicles.

The radiation transmitting and receiving devices 17a and 17h may be ultrasonic as aforementioned or may use a radio frequency emission, and the speed of movement of the foot may be detected by using the Doppler effect.

Whereas a single pair of transmission and receiving devices has been shown it is envisaged that further devices may be used, one pair for example being utilised to detect position and/or speed of movement in one plane, and another pair of devices being used to detect position and/or speed of movement in another plane.

It is envisaged that the control circuit 18 may have further input signals indicated on input line 20 which may incorporate signals received from the vehicle indicative of speed and/or other important criteria.

Referring now in addition to FIG. 2 the control circuit indicated within the dotted outline 18 has connected thereto the radiation transmitting and receiving devices 17a and 17b and a further input which may be on line 20 (in FIG. 1) and comprising a throttle indicating position provided by variable resistor 21. Further input signals may be provided by the conventional brake light operating switch 22 and also an unconventional switch 23 which may comprise a pressure sensitive, contact or proximity device mounted on or near the accelerator and which changes condition as soon as the foot of the driver leaves or moves away from the accelerator.

Also connected to the circuit 18 is the signalling means 19 in the circuit indicated as a high mounted stop lamp (HMSL).

The control circuit is controlled by a micro-controller 24, a micro-controller sold under the designation P1C16C71 being found to be suitable. The micro-controller 24 drives integrated circuit 25 which in turn powers the ultrasonic transmitter 17a. The received signal received by ultrasonic receiver 17b is connected through a pair of operational amplifiers in sub-circuit 26 back to micro-controller 24 which has outputs 28 and 29 to the signalling means 19.

An additional switch 30 is provided and is selectively operable to control the micro-controller 24 so that the device may be suitable for vehicles where there are differing distances between the mounting of the transmitter and receiver and the accelerator pedal and brake pedal and/or differing distances between the accelerator pedal and brake pedal.

Figure 3:
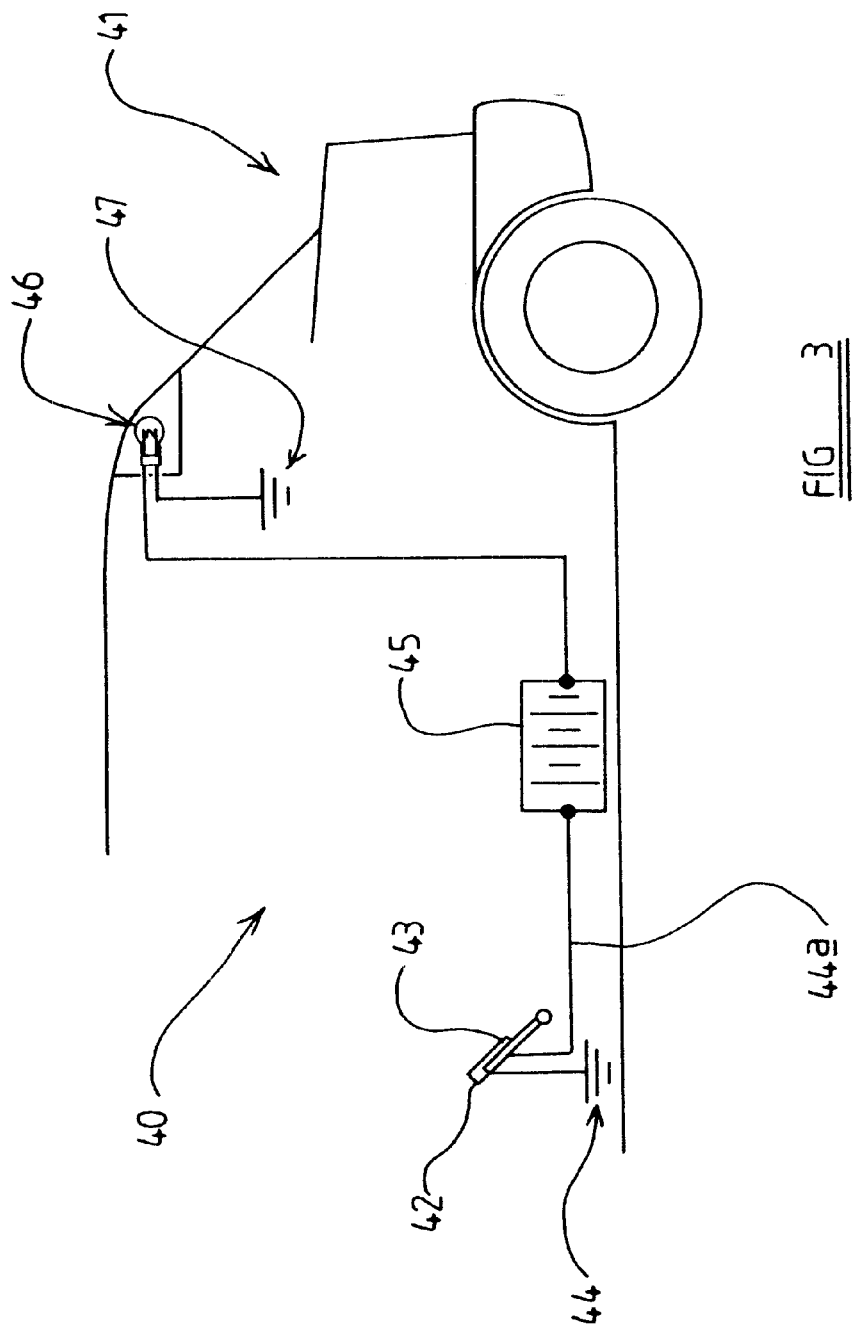
FIG. 3 illustrates an alternative or additional sensing means.

Referring now in addition to FIG. 3 a simplified arrangement is shown which may be used as an alternative to the arrangement shown in FIGS. 1 and 2 or in conjunction therewith. FIG. 3 shows part of a vehicle shown schematically at 40 the vehicle 40 having a rear end 41 and an accelerator 42.

On or near the accelerator 42 there is mounted a pressure-sensitive, contact or proximity switch 43 having one terminal connected to earth at 44, the other terminal being connected by conductor 44a to battery 45 and to signalling means 46, which may comprise a high-mounted stop lamp provided on modern vehicles. The other terminal of the lamp 46 is connected to earth at 47.

The arrangement shown in FIG. 3 detects movement of the foot of the driver as soon as the foot is removed from or moved away from the accelerator pedal 42 and may be operative to activate the signalling means 46.

It will be appreciated that additional input signals may be used and a control circuit such as the circuit shown at 18 may be incorporated in the circuit, the control circuit 18 receiving other information concerning the state of the vehicle such as its speed etc.

It is further envisaged that time delays may be incorporated into the circuit, such delays being incorporated only to ensure that the hazard signal emitted by the signalling means remains on for a pre-determined amount of time which may itself depend on other input signals associated with the condition of the vehicle, such delay means not being used to delay activation of the signalling means 46.

It will be appreciated that the examples shown herein are examples of many different forms which the invention may take to achieve an apparatus and method of providing a signal indicative of the likelihood of braking of a vehicle.

Furthermore, whilst the foregoing description and accompanying drawings illustrate the invention primarily for use in conjunction with a driver's foot, it will be appreciated that the invention is equally applicable in cases where other parts of the driver, e.g, the hand, are used to apply brakes, such as may be the case with vehicles adapted for use by disabled persons.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. Signalling means adapted for use on a vehicles, said signalling means being activated in response to a signal from a sensing means, said sensing means being adapted to produce a signal to activate said signalling means in response to sensing movement of a brake operating part of a driver in a direction from an accelerator provided on the vehicle towards brake operating means provided on the vehicle, and wherein on activation of the signalling means is not deactivated by said sensing means until movement of the brake operation part of the driver from the brake operating means in a direction towards the accelerator is detected.

2. Signalling means as claimed in claim 1 wherein said sensing means senses the position of the brake operating part of the driver.

3. Signalling means as claimed in claim 1 wherein the sensing means senses the speed of movement of the brake operating part of the driver.

4. Signalling means as claimed in claim 1 wherein said sensing means includes a radiation transmission device and a radiation receiving device the arrangement being such that the radiation transmitting device transmits radiation towards the brake operating part of the driver and said receiving device receives a reflected signal from the brake operating part of the driver, said receiving device providing a signal indicative of movement of the brake operating part of the driver in a direction likely to result in the brakes associated with the vehicle being applied.

5. Signalling means as claimed in claim 4 wherein said sensing means comprise two or more pairs of radiation transmitting and receiving devices.

6. Signalling means as claimed in claim 4 wherein said radiation transmitting device transmits ultrasonic radiation.

7. Signalling means as claimed in claim 1 wherein said sensing means are connected to a control circuit and said control circuit has at least one further input indicative of a condition of the vehicle or of a position of control means for operating the vehicle.

8. Signalling means as claimed in claim 7 wherein said control circuit has an input indicative of the speed of the vehicle.

9. Signalling means as claimed in claim 7 wherein said control circuit has an input indicative of the position of the accelerator of the vehicle.

10. Signalling means as claimed in claim 7 wherein said control circuit has an input indicative when the vehicle is stationery.

11. Signalling means as claimed in claim 7 wherein said control circuit has an input adapted to cause said signalling means to be deactivated only after a pre-determined period of time.

12. Signalling means as claimed in claim 11 wherein said pre-determined period of time may be altered by said control circuit depending on an input signal to said control circuit indicative of a change of condition of said vehicle.

13. Signalling means as claimed in claim 1 wherein the brake operating part of the driver comprises the driver's foot.

14. Signalling means as claimed in claim 1 wherein said signalling means comprises a light-emitting device.

15. Signalling means as claimed in claim 14 wherein said light-emitting device comprises a high-mounted stop lamp provided on a vehicle.

16. Signalling means as claimed in claim 14 wherein said light-emitting device comprises a lamp additional to the lamps normally provided on a vehicle.

17. Signalling means as claimed in claim 14 wherein the signal emitted by said signalling means is visible only from the rear of the vehicle.

* * * * *